US011468627B1

(12) United States Patent
Stahl et al.

(10) Patent No.: US 11,468,627 B1
(45) Date of Patent: Oct. 11, 2022

(54) VIEW DEPENDENT CONTENT UPDATED RATES

(71) Applicant: Apple Inc., Cupertino, CA (US)

(72) Inventors: Geoffrey Stahl, San Jose, CA (US); Thomas Post, San Francisco, CA (US); Tobias Eble, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/081,198

(22) Filed: Oct. 27, 2020

Related U.S. Application Data

(60) Provisional application No. 62/932,576, filed on Nov. 8, 2019.

(51) Int. Cl.
*G06T 15/20* (2011.01)
*G06T 15/00* (2011.01)
*G06T 17/00* (2006.01)

(52) U.S. Cl.
CPC .......... *G06T 15/20* (2013.01); *G06T 15/005* (2013.01); *G06T 17/00* (2013.01)

(58) Field of Classification Search
CPC ....... G06T 15/20; G06T 17/00; G06T 15/005; G06T 19/006
See application file for complete search history.

(56) References Cited

U.S. PATENT DOCUMENTS

| 5,867,166 | A * | 2/1999 | Myhrvold | G06T 15/04 345/649 |
| 6,064,393 | A * | 5/2000 | Lengyel | G06T 15/005 345/473 |
| 7,312,766 | B1 * | 12/2007 | Edwards | H04N 5/23293 359/630 |
| 8,970,580 | B2 | 3/2015 | Jang et al. | |
| 10,692,288 | B1 * | 6/2020 | Rasmussen | A63F 13/213 |
| 11,169,832 | B1 * | 11/2021 | Ngai | G06T 19/006 |
| 11,302,285 | B1 * | 4/2022 | Grundhoefer | G02B 27/0093 |
| 2012/0176364 | A1 * | 7/2012 | Schardt | G06T 15/405 345/419 |
| 2014/0176591 | A1 * | 6/2014 | Klein | G09G 5/026 345/589 |
| 2014/0267420 | A1 * | 9/2014 | Schowengerdt | G02B 27/017 345/633 |
| 2015/0002542 | A1 * | 1/2015 | Chan | G02B 27/017 345/633 |
| 2015/0235449 | A1 | 8/2015 | Schowengerdt et al. | |
| 2015/0379772 | A1 * | 12/2015 | Hoffman | G02B 27/0093 345/633 |
| 2017/0018121 | A1 * | 1/2017 | Lawson | G06T 17/00 |
| 2018/0047129 | A1 | 2/2018 | Cerny et al. | |

(Continued)

OTHER PUBLICATIONS

Schaufler, Per-Object Image Warping with Layered Impostors, 1998 (Year: 1998).*

(Continued)

*Primary Examiner* — Phong X Nguyen
(74) *Attorney, Agent, or Firm* — Thompson Hine LLP

(57) ABSTRACT

Various implementations disclosed herein include devices, systems, and methods that enable improved display of virtual content in computer generated reality (CGR) environments. In some implementations, the virtual content is viewed by an observer and includes multiple content elements, each of which may be rendered at an independent rate based on a change of view of the observer.

20 Claims, 7 Drawing Sheets

(56) References Cited

U.S. PATENT DOCUMENTS

| | | | |
|---|---|---|---|
| 2018/0082484 A1* | 3/2018 | Mallinson | G02B 27/0172 |
| 2018/0197304 A1* | 7/2018 | Golas | G06T 15/005 |
| 2018/0365882 A1* | 12/2018 | Croxford | G06T 7/70 |
| 2020/0107024 A1* | 4/2020 | Saeedi | H04N 19/14 |
| 2020/0134923 A1* | 4/2020 | Seiler | G06T 19/006 |

OTHER PUBLICATIONS

Sitthi-amorn et al., Automated Reprojection-Based Pixel Shader Optimization, 2008 (Year: 2008).*
Li et al., DeltaVR: Achieving High-Performance Mobile VR Dynamics through Pixel Reuse, 2019 (Year: 2019).*
Chaudhuri, Parag Kumar; Kalra, Prem Kumar; Banerjee, Subhashis; "Reusing View-Dependent Animation", The Visual Computer; Jun. 26, 2007, vol. 23, No. 9-11, pp. 707-719.
Getz, Gabby, "Improving Performance with Explicit Rendering", The Cesium Blog, Jan. 24, 2018, pp. 1-6.
"Render Loop vs. Explicitely Calling Update Method", https://stackoverflow.com/questions/43180022/render-loop-vs-explicitely-call-update; Jul. 23, 2019; pp. 1-4.

* cited by examiner

VIEW DEPENDENT CONTENT UPDATED RATES

CROSS-REFERENCE TO RELATED APPLICATIONS

This Application claims the benefit of U.S. Provisional application Ser. No. 62/932,576 filed Nov. 8, 2019, which is incorporated herein in its entirety.

TECHNICAL FIELD

The present disclosure generally relates to updating content in a computer-generated reality (CGR) environment, and in particular, to systems, methods, and devices for rendering and compositing CGR objects in a CGR environment.

BACKGROUND

Providing content in computer generated reality (CGR) environments may require considerable computational power to generate adequate resolution with minimal distortion. Moreover, transmitting video data to devices, such as a head-mounted device (HMD), may require high transmission bandwidth.

SUMMARY

Various implementations disclosed herein include devices, systems, and methods for providing a computer generated reality (CGR) environment having multiple content elements that are rendered (e.g., converted from three-dimensional models to two- dimensional representations) and composited together (e.g., combined in one or more frames of a series of frames). Each of the content elements is not necessarily re-rendered at each frame but rather may be re-rendered based on whether a change from a prior state, e.g., in the prior frame, would require a significantly different appearance. Some implementations determine whether to re-render a content element for a given frame based on determining an error. Such an error may correspond, for example, to a measure of an effect of a change in perspective on the appearance of the content element if it is not re-rendered, e.g., an object not appearing rotated as it should given a change in the viewer's viewing angle.

In some implementations, an error (e.g., quantified in pixels) corresponding to reusing a first rendering of one or more content elements from a first frame (e.g., the frame before) in a second frame (e.g., the current frame) of a CGR environment is determined. For example, the error may be based on an observer's rate of change in position, the observer's gaze, the observer's distance from a composition plane upon which an object will be composited, a distance of a point in an object furthest from the composition plane, a distance the observer moved since an object was last re-rendered, or how much an object has changed in itself since it was last rendered (e.g., animations within the object).

In some implementations, it is determined (e.g., based on the corresponding error) whether to generate a second rendering by re-rendering the content element (e.g., a portion of another content element) for the second frame or to re-use the first rendering of the content element from the first frame for the second frame. For example, re-rendering may include generating a two-dimensional (2D) representation of the content element based on a three-dimensional (3D) model of the content element. In some implementations, the error is compared to a threshold and the determination of whether to generate a second rendering by re-rendering the content element for the second frame or to re-use the first rendering of the content element from the first frame for the second frame is based on the comparison of the error to the threshold. In some implementations, the second rendering includes rendering geometry of the content element to a buffer (e.g., pre-rendered object) and then transforming the buffer based on one or more display properties (e.g., distortion).

In some implementations, the second frame of the CGR environment is generated by compositing additional frame content (e.g., renderings of other content elements) with the first rendering or the second rendering (e.g., re-rendering) of the content element. For example, the compositing may include combining a layer including the first rendering or the second rendering of the content element with a layer including a rendering of the additional content. In some implementations, the re-rendering is performed at a first rate (e.g., by a first device) and the compositing is performed at a second rate (e.g., by a second device), where the first rate is independent of the second rate.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
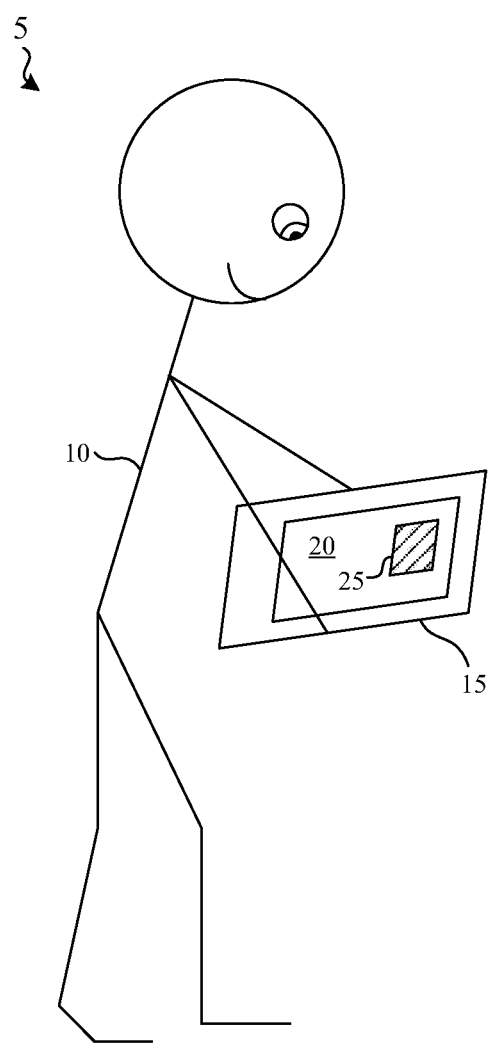
FIG. 1 illustrates a physical environment including a user and a device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Referring to FIG. 1, an example physical environment 5 is illustrated in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 5 includes a user 10 and a device 15, e.g., a mobile device, head-mounted device (HMD), laptop, desktop, etc. In some implementations, a user 10 of the device 15 may view virtual content 25 (e.g., 3-D content) on a display 20 of the device 15.

In some implementations, the device 15 is remotely connected (e.g., via a wired or wireless connection) to the display 20 and may generate virtual content 25 of differing refresh rate or resolution based on properties associated with the connection or the display 20. For example, to the extent that some remote connections may provide a higher bandwidth connection than others, the refresh rate or resolution of the virtual content 25 may be limited by the bandwidth of the connection. In some implementations, the refresh rate or resolution of the virtual content 25 may be limited by processing capabilities of the device 15 (e.g., processor speed, memory, etc.).

In some implementations, the virtual content 25 includes renderings of multiple content elements and, in order to preserve bandwidth or processing capabilities, a portion of the renderings may be refreshed while the remainder of the renderings are not refreshed. For example, a perspective of the user 10 regarding the virtual content 25 may change due to a change in position of the user 10 relative to the device 15 or relative to the virtual content 25. Accordingly, the device 15 may re-render content elements (e.g., portions of larger content elements) and the transmitted virtual content 25 may include the updated renderings. Similarly, renderings that remain unchanged from one frame of the virtual content 25 to the next frame of the virtual content 25 may not be refreshed.

In addition, the nature of the display 20 may determine the size, resolution or format of the virtual content 25 sent to the display 20. For example, initial communications between a device 15 and the display 20 may include information about the qualities or properties of the display 20. Such information may then be used to determine size, quality, format, refresh rate, etc. of virtual content 25 sent to the display 20.

In some implementations, the device 15 includes an integrated controller or is in communication with a separate controller, one or both of which may be in the physical environment 5. A physical environment refers to a physical world that people can sense and/or interact with without aid of electronic systems. Physical environments, such as a physical park, include physical articles, such as physical trees, physical buildings, physical locations, and physical people (e.g., user 10). People can directly sense and/or interact with the physical environment 5, such as through sight, touch, hearing, taste, and smell.

In some implementations, the device 15 is configured to manage, coordinate, and, present a computer generated reality (CGR) environment to the user 10. In some implementations, the device 15 includes a suitable combination of software, firmware, or hardware. The device 15 is described in greater detail below with respect to FIG. 6. In some implementations, a controller of the device 15 is a computing device that is local or remote relative to the physical environment 5. In some implementations, the functionalities of the controller of the device 15 are provided by or combined with the device 15, for example, in the case of a head-mounted device (HMD) that functions as a stand-alone unit.

In one example, a controller of the device 15 is a local server located within the physical environment 5. In another example, the controller of the device 15 is a remote server located outside of the physical environment 5 (e.g., a cloud server, central server, etc.). In some implementations, the controller of the device 15 is communicatively coupled with the device 15 via one or more wired or wireless communication channels (e.g., BLUETOOTH, IEEE 802.11x, IEEE 802.16x, IEEE 802.3x, etc.).

According to some implementations, the device 15 presents a CGR environment to the user 10 while the user 10 is present within the physical environment 5. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
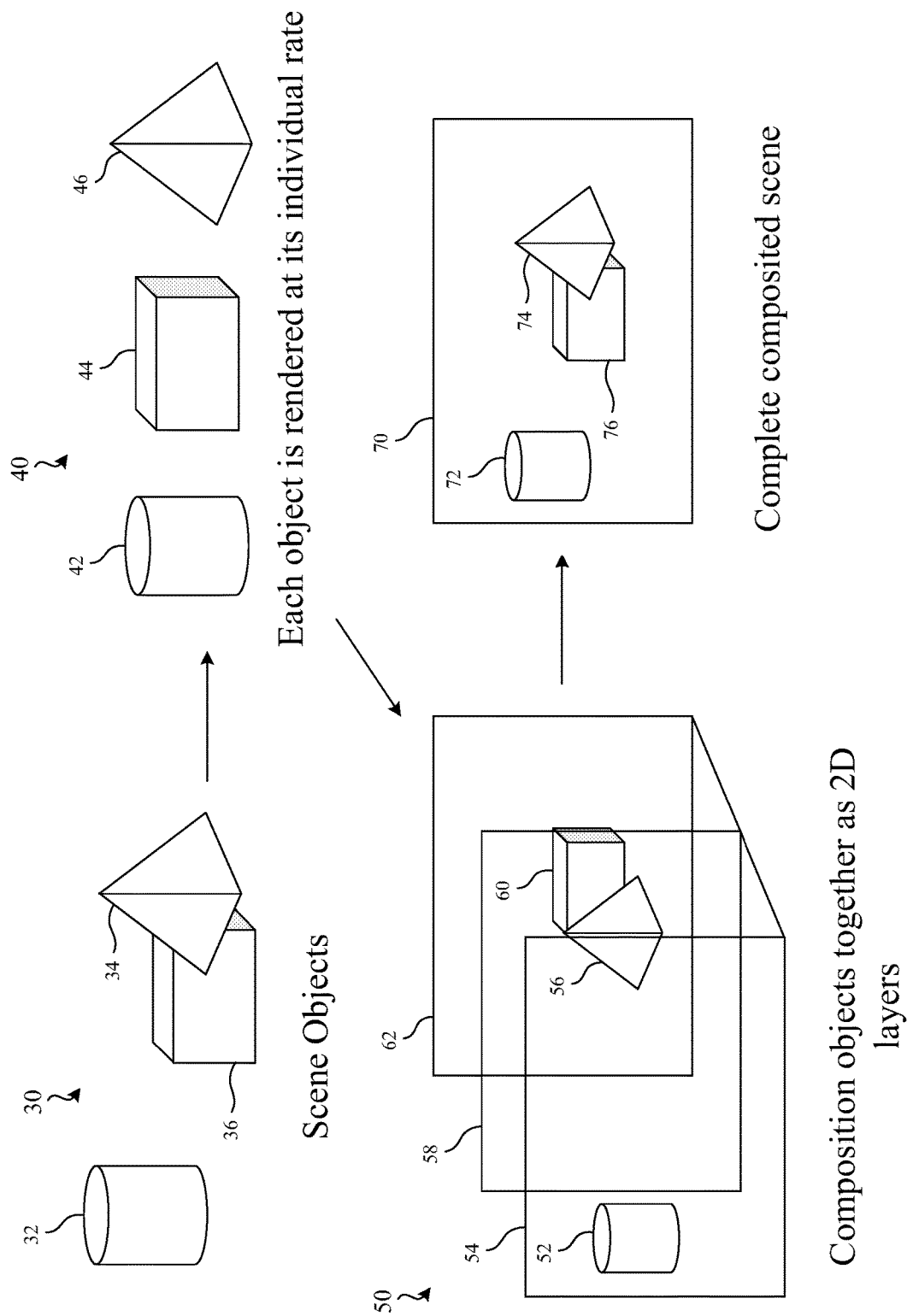
FIG. 2 illustrates rendering and composition of content elements in a scene of a computer generated reality (CGR) environment in accordance with some implementations.

Referring to FIG. 2, a rendering and composition of content elements in a CGR environment is illustrated in accordance with some implementations. As illustrated in process 30 of FIG. 2, in some implementations, virtual content (e.g., scene objects 30) is identified or selected. For example, the virtual content 25 to be displayed to the user 10 may include illustrative content elements, such as cylinder 32, pyramid 34, and cuboid 36. In some implementations, the virtual content 25 is displayed to the user 10 (e.g., in a 3D virtual view) via the device 15. In some implementations, virtual content 25 including content elements may be displayed at different depths in the scene 30. For example, pyramid 34 may appear to the user 10 to be closer proximity to the user 10 than cuboid 36. In some implementations, the content elements (e.g., cylinder 32, pyramid 34, and cuboid 36) may be overlaid on or composited in a view of the user's environment with respect to the user's current line of sight that is provided by the device 15.

As illustrated in process 40 of FIG. 2, each content element of the virtual content 25 may be rendered at its own individual rate. For example, rendering may include taking a 3-D model of each content element and then creating a 2-D view of each content element. For example, content elements such as cylinder 32, pyramid 34, and cuboid 36, may respectively be rendered as rendered cylinder 42, rendered cuboid 44, and rendered pyramid 46. In some implementations, in order to reduce latency, bandwidth, or computing requirements associated with rendering of the virtual content 25, each content element may be rendered independently of the other content elements, e.g., only re-rendering content elements that have changed. For example, the device 15 may determine to render or re-render individual content elements based at least in part on inputs obtained from the device 15 (e.g., changes based on camera position, user position, content placement, etc.). In some implementations, sensors associated with the device 15 are used to provide depth information for rendering of content elements relative to the real environment and, in some implementations, the sensors associated with the device 15 are used to provide orientation and motion information for the user in the real environment.

In some implementations, virtual content 25 is rendered to a buffer and the contents of the buffer undergo further processing. For example, the content elements may be rendered to a buffer in a first pass and then the contents of the buffer may be adjusted to compensate for properties of the display 20 (e.g., distortion) in a second pass.

In some implementations, the device 15 includes one or more world mapping sensors (e.g., infrared (IR) cameras with an IR illumination source, or Light Detection and Ranging (LIDAR) emitters and receivers/detectors) that capture depth or range information for objects and surfaces in the user's environment. The range information may, for example, be used in positioning content elements composited into images of the real environment at correct depths. In some implementations, the range information may be used in adjusting the depth of virtual content in the environment when displayed. For example, a content element may be re-rendered larger as the user 10 moves closer to the content element or smaller as the user 10 moves away from the content element. Moreover, the content element may be re-rendered with a different perspective as the user 10 changes an angle of viewpoint with respect to the content element.

In some implementations, the content element may be a portion of another content element. For example, a content element such as a building may include additional content elements of one or more windows. Thus, when rendering a content element such as a building, the facade of the building may be mostly flat and may be reused for a new frame (e.g. by reprojection) without re-rendering the building. However, content elements such as one or more windows of the building may not be reused due to changes in an observer's view of an interior of the building (e.g., due to a change in the observer's position, gaze, or viewpoint).

As illustrated in process 50 of FIG. 2, each rendered object may be composited together (e.g., using two-dimensional layers) in order to complete a composited scene 70. For example, layer 54 may include rendered cylinder 42, layer 58 may include rendered pyramid 46, and layer 62 may include rendered cuboid 44. In some implementations, composition is performed at a constant rate, e.g., decoupled from the rendering rates of the one or more content elements. In some implementations, the device 15 includes an image processor which parses the rendered content elements into one or more foreground elements (e.g., rendered pyramid 46) and one or more background elements (e.g., rendered cuboid 44) to form a composition (e.g., composited scene 70). Moreover, the composited scene 70 may include a perspective shift between the foreground elements and the background elements, and may be based on depth information or viewing condition data. In some implementations, the composited scene 70 is provided to and displayed by the display 20 of the device 15.

Figure 3:
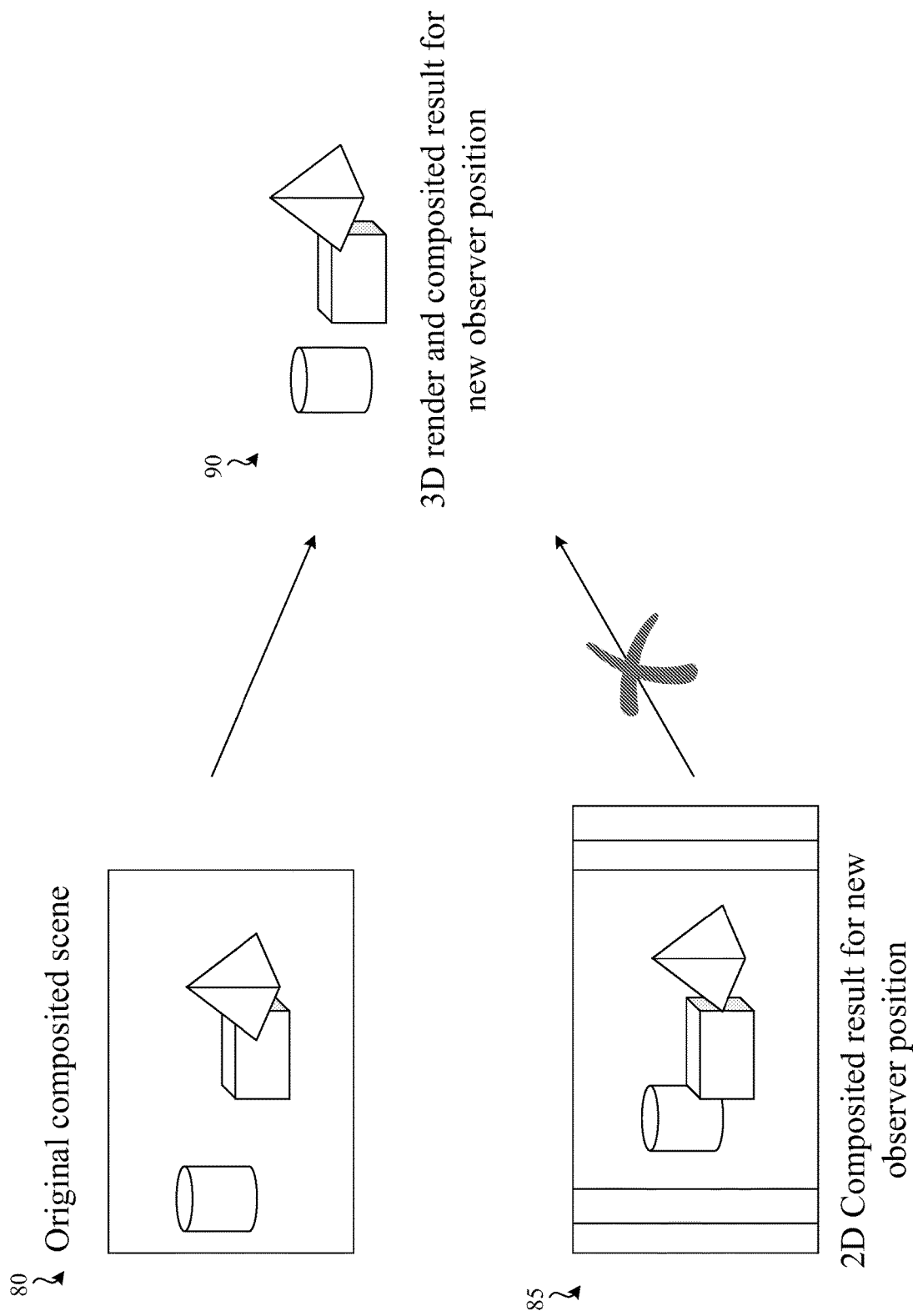
FIG. 3 illustrates re-rendering and composition of content elements in response to a change in observer position in accordance with some implementations.

Referring to FIG. 3, in some implementations, content elements are re-rendered and composited in response to a change in position of an observer. For example, compositing of the pre-rendered objects may be performed with a limited scope and, if the position of the user 10 changes, the limited scope of the compositing may start to introduce errors.

As shown in process 80 of FIG. 3, the originally composited scene includes multiple content elements, e.g., displayed at varying depths and angles. When an observer of the scene moves or changes position relative to the scene, a corresponding shift of the content elements must occur in order to provide a realistic appearance of the content elements.

As shown in process 85 of FIG. 3, errors may result if none of the content elements are re-rendered, but instead are simply re-composited for the new observer position. In some implementations, the limited scope of the compositing may start to introduce errors as the position of the observer changes. For example, the virtual content elements may not be oriented realistically or may not be positioned correctly (e.g., absolute or relative to other content elements) based on the new observer position.

In some implementations, an evaluating metric is used to quantify one or more errors (e.g., introduced through the limited scope in composition when the observer position changes) associated with one or more content elements. For example, the evaluating metric may be used to assign an error value to a particular content element (e.g., a particular portion of a larger content element) and that particular content element may be re-rendered when the error value exceeds a threshold value. In some implementations, the evaluating metric is based on changes in observer distance from the composition plane (e.g., resolution in change distance to composition plane), changes in distance of the point in the content element farthest away from the composition plane, distance moved by the observer since the content element was last rendered, change in the observer's gaze since the content element was last rendered, or how much the content element has changed in itself since it was last rendered (e.g., animations within the content element, transforms, etc.).

In some implementations, the evaluating metric is based on a change in the gaze of the observer. For example, a value of the evaluating metric associated with a content element of a building may not exceed a threshold value for re-rendering when a gaze of the observer changes. However, a value of an evaluating metric associated with a content element of a window of the building may exceed the threshold value for re-rendering based on the same change in the gaze of the observer (e.g., due to a change in a visible interior of the building).

Figure 4:
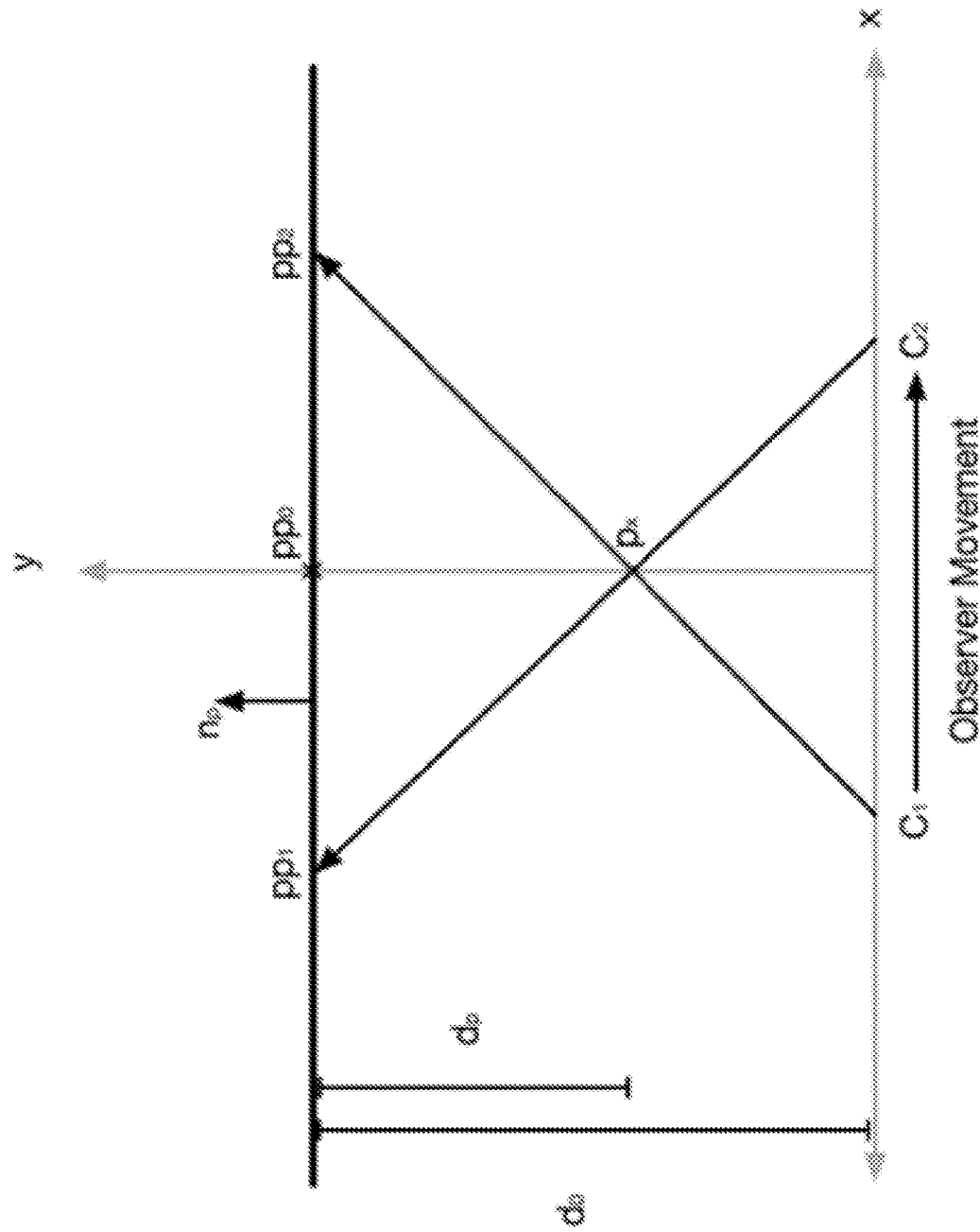
FIG. 4 illustrates observer movement with respect to a composition plane in accordance with some implementations.

Referring to FIG. 4, observer movement is illustrated with respect to a composition plane. In some implementations, the point considered for error calculation (e.g., $\vec{p_x}$) is the point furthest away from a composition plane and is calculated by $$\vec{p_x} := \begin{pmatrix} 0 \\ d_o - d_p \end{pmatrix},$$

where $d_p$ represents a distance of a furthest point in a content element from its composition plane and $d_o$ represents a distance from an observer to the composition plane.

The distance moved by an observer may be represented by $\Delta_c$, an observer start position may be represented by $$\vec{c_1} := \begin{pmatrix} \frac{\Delta_c}{2} \\ 0 \end{pmatrix},$$

and an observer end position may be represented by $$\vec{c_2} := \begin{pmatrix} -\frac{\Delta_c}{2} \\ 0 \end{pmatrix}.$$

A point on the composition plane may be represented by $$\vec{pp_o} := \begin{pmatrix} 0 \\ d_o \end{pmatrix},$$

a plane normal of the composition plane may be represented by $$\vec{n_p} := \begin{pmatrix} 0 \\ 1 \end{pmatrix},$$

and a vector plane intersection may be represented as follows:

$$f_{PI}\left(\vec{p}, \vec{n}, \vec{v}, \vec{v_O}\right) := \left(\frac{(\vec{p} - \vec{v_O}) \cdot \vec{n}}{\vec{v} \cdot \vec{n}} * \vec{v}\right) + \vec{v_O},$$

where $\vec{p}$ is the plane position, $\vec{n}$ is the plane normal, $\vec{v}$ is the vector, and $\vec{v_O}$ is the vector origin. Accordingly, projected points $\vec{pp_1}$ and $\vec{pp_2}$ may be represented by $$\vec{pp_1} := f_{PI}\left(\vec{pp_0}, \vec{n_p}, \vec{p_x} - \vec{c_1}, \vec{c_1}\right) \text{ and}$$

$$\vec{pp_2} := f_{PI}\left(\vec{pp_0}, \vec{n_p}, \vec{p_x} - \vec{c_2}, \vec{c_2}\right).$$

Thus, in some implementations, the evaluating metric is calculated based on an error in pixels. For example, $$f_\alpha\left(\vec{x}, \vec{y}\right) := \arccos\left(\frac{\vec{x} \cdot \vec{y}}{\|\vec{x}\| \|\vec{y}\|}\right),$$

$$E_\alpha := f_\alpha\left(\vec{pp_2} - \vec{c_2}, \vec{pp_1} - \vec{c_1}\right), \text{ and } E_{pixel} := E_\alpha * ppd,$$

where $E_{pixel}$ represents the error in pixels, $E_\alpha$ represents the error in angle, and ppd represents pixels per degree.

However, as shown in process 90, in some implementations, one or more of the content elements (e.g., one or more portions of the content elements) may be re-rendered and composited for the new observer position. By selectively re-rendering one or more of the content elements, errors such as an unrealistic orientation or spacing of the content elements may be minimized. For example, if the evaluated error for a given object is above a certain threshold, the object may be re-rendered for the new position of the observer. Moreover, error may be measured in pixels, e.g., 1 pixel of error in screen space may occur when the observer moves at 1.2m/s and compositing is performed at 120 Hz or a 2D plane.

Figure 5:
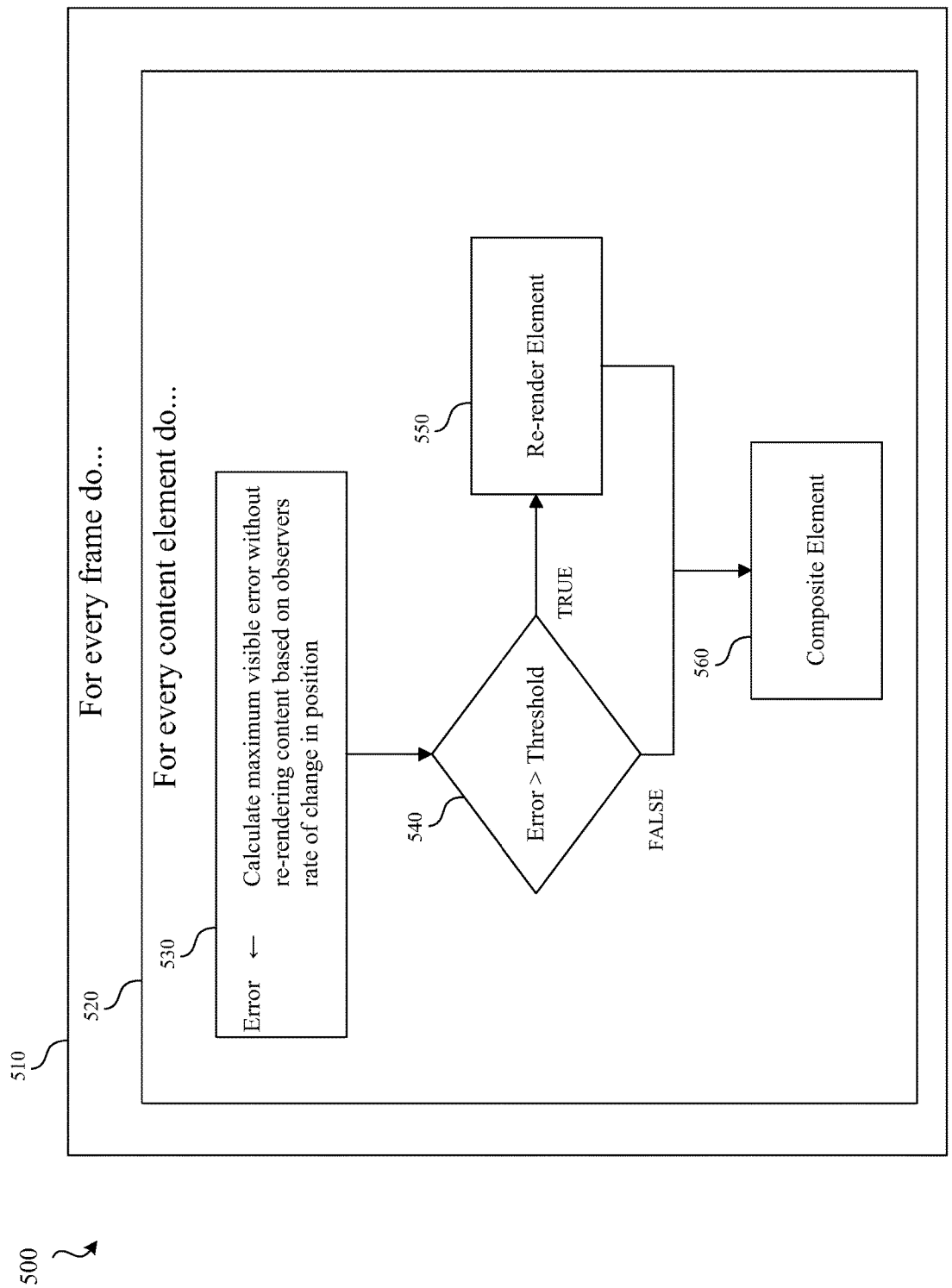
FIG. 5 is a block diagram illustrating a flowchart of a system that re-renders and composites content elements of a CGR environment, according to some implementations.

As shown in FIG. 5, a block diagram 500 illustrates a flowchart of a system that re-renders and composites content elements of a CGR environment, according to some implementations. In block 510, the system performs block 520 for every frame. Block 520 is then performed for ever content element, including block 520 through block 560.

At block 530, an error value is determined by calculating a maximum visible error (e.g., without re-rendering the content element) based on an observer's rate of change in position. At block 540, the calculated error is compared to a threshold value. If the error exceeds the threshold, the content element is re-rendered at block 550. If the error does not exceed the threshold, the content element is not re-rendered. At block 560, the content element is composited.

Figure 6:
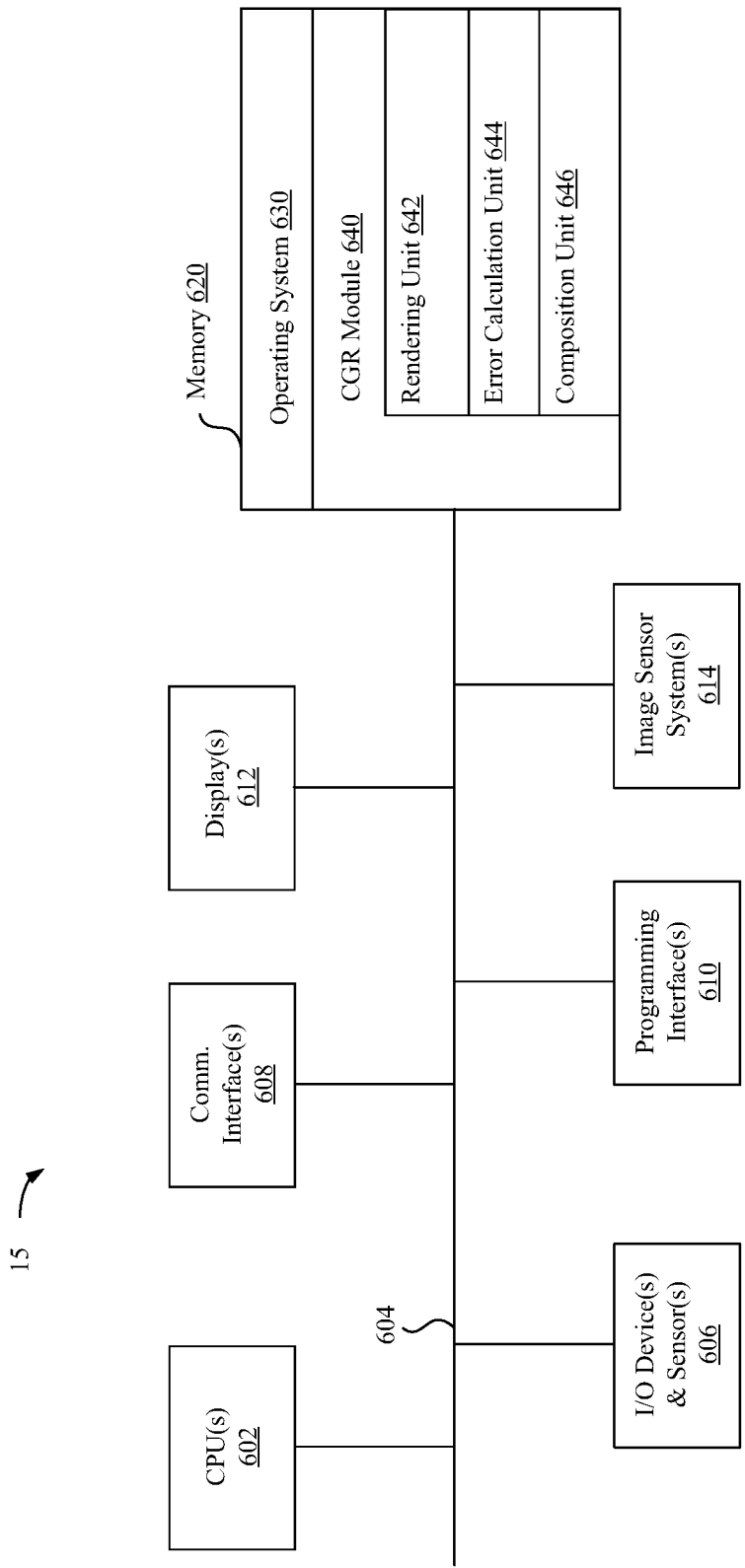
FIG. 6 is a block diagram of an example device in accordance with some implementations.

FIG. 6 is a block diagram of an example of the device 15 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 15 includes one or more processing units 602 (e.g., microprocessors, ASICs, FPGAs, GPUs, CPUs, processing cores, or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 610, one or more displays 612, one or more interior or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 612 are configured to present a CGR environment to the user. In some implementations, the one or more displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays 612 correspond to diffractive, reflective, polarized, holographic, etc. waveguide displays. For example, the device 15 includes a single display. In another example, the device 15 includes a display for each eye of the user.

The memory 620 includes high-speed random-access memory, such as DRAM, CGRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium. In some implementations, the memory 620 or the non-transitory computer readable storage medium of the memory 620 stores the following programs, modules and data structures, or a subset thereof including an optional operating system 630 and a CGR module 640.

The operating system 630 includes procedures for handling various basic system services and for performing hardware dependent tasks.

In some implementations, the CGR module 640 is configured to create, edit, present, or experience CGR environments. In some implementations, the CGR module 640 includes a rendering unit 642, an error calculation unit 644, and a composition unit 646.

In some implementations, the rendering unit 642 is configured to render one or more content elements. For example, the rendering unit 642 may generate a 2D representation of the content element(s) based on a 3D model of the content element.

In some implementations, the error calculation unit 644 is configured to quantify one or more errors associated with one or more content elements. For example, the error calculation unit 644 may assign an error value to a particular content element and that particular content element may be re-rendered when the error value exceeds a threshold value. In some implementations, the error value is assigned based on changes in observer distance from the composition plane, changes in distance of the point in the content element farthest away from the composition plane, distance moved by the observer since the content element was last rendered, or how much the content element has changed in itself since it was last rendered (e.g., animations within the content element).

In some implementations, the composition unit 646 is configured to composite renderings of one or more content elements, as well as any additional frame content. For example, the composition unit 646 may combine a layer including the previous rendering or a re-rendering of a content element with a layer including a rendering of the additional content. In some implementations, the rendering unit 642 and the composition unit 646 operate at different, independent rates.

Although these modules and units are shown as residing on a single device (e.g., the device 15), it should be understood that in other implementations, any combination of these modules and units may be located in separate computing devices. Moreover, FIG. 6 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 7:
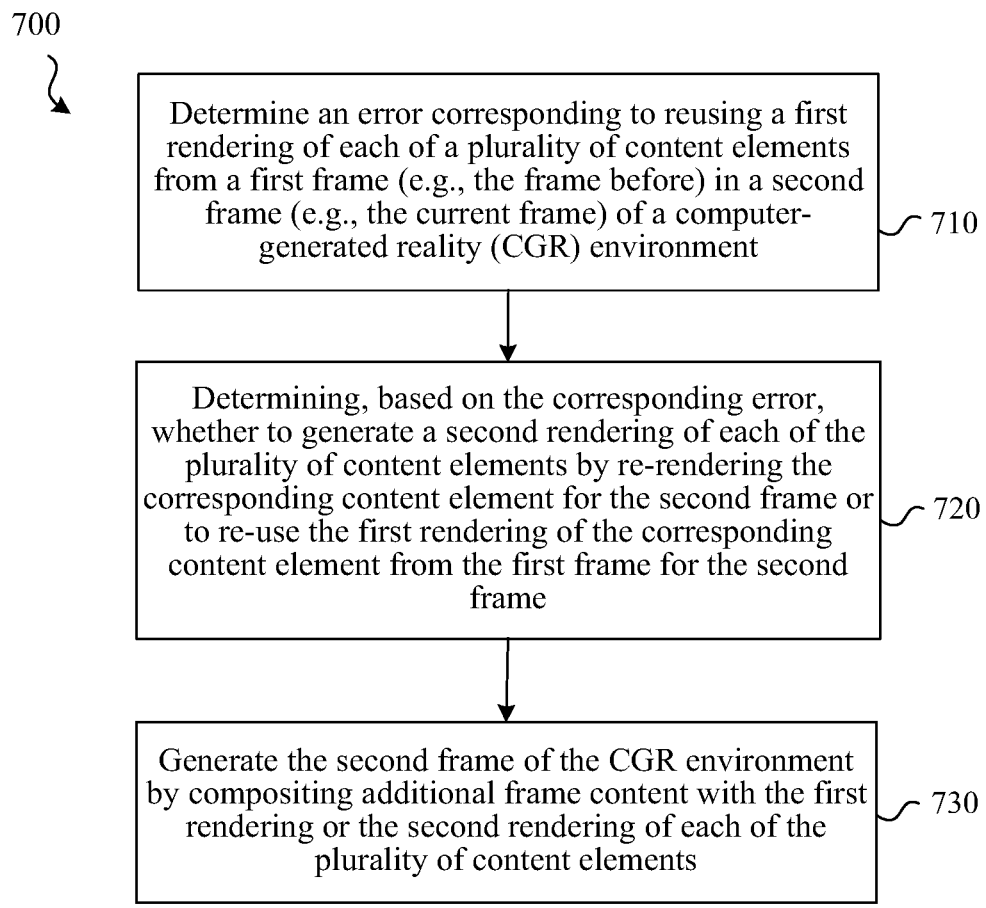
FIG. 7 is a flowchart illustrating an exemplary method of rendering and compositing content elements of a CGR environment, according to some implementations.

FIG. 7 is a flowchart illustrating an exemplary method of rendering and compositing content elements of a CGR environment, according to some implementations. In some implementations, the method 700 is performed by a device (e.g., device 15 of FIGS. 1-6). The method 700 may be performed at a mobile device, HMD, desktop, laptop, server device, or by multiple devices in communication with one another. In some implementations, the method 700 is performed by processing logic, including hardware, firmware, software, or a combination thereof In some implementations, the method 700 is performed by a processor executing code stored in a non-transitory computer-readable medium (e.g., a memory).

At block 710, the method 700 determines an error corresponding to reusing a first rendering of each of a plurality of content elements from a first frame (e.g., the frame before) in a second frame (e.g., the current frame) of a computer-generated reality (CGR) environment. In some implementations, the error is based on an observer's rate of change in position, the observer's distance from a composition plane upon which an object will be composited, a distance of a point in an object furthest from the composition plane, a distance the observer moved since an object was last re-rendered, or how much an object has changed in itself since it was last rendered (e.g., animations within the object).

At block 720, the method 700 determines, based on the corresponding error, whether to generate a second rendering of each of the plurality of content elements by re-rendering the corresponding content element for the second frame or to re-use the first rendering of the corresponding content element from the first frame for the second frame.

In some implementations, re-rendering includes generating a 2D representation of each content element based on a 3D model of the content element. In some implementations, the error is compared to a threshold and the determination of whether to generate a second rendering by re-rendering the content element for the second frame or to re-use the first rendering of the content element from the first frame for the second frame is based on the comparison of the error to the threshold. In some implementations, the second rendering includes rendering geometry of the content element to a buffer (e.g., pre-rendered object) and then transforming the buffer based on one or more display properties (e.g., distortion).

At block 730, the method 700 generates the second frame of the CGR environment by compositing additional frame content with the first rendering or the second rendering of each of the plurality of content elements. In some implementations, the re-rendering (e.g., at block 720) is performed at a first rate (e.g., by a first device) and the compositing (e.g., at block 730) is performed at a second rate (e.g., by a second device), where the first rate is independent of the second rate.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub- blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
   determining a first error corresponding to reusing a first rendering of a first content element from a first frame in a second frame of a computer-generated reality (CGR) environment, wherein the first error is based on a pose change of the electronic device and a first distance between the electronic device and the first content element;
   determining a second error corresponding to reusing a first rendering of a second content element from the first frame in the second frame of the CGR environment, wherein the second error is based on the pose change of the electronic device and a second distance between the electronic device and the second content element;
   determining, based on the first error, to re-use the first rendering of the first content element from the first frame for the second frame;
   determining, based on the second error, to generate a second rendering of the second content element by re-rendering the second content element for the second frame, wherein re-rendering comprises generating a two-dimensional (2D) representation of the second content element based on a three-dimensional (3D) model of the second content element; and
   generating the second frame of the CGR environment by compositing the first rendering of the first content element with the second rendering of the second content element.

2. The method of claim 1 further comprising comparing the second error to a threshold and wherein determining to generate a second rendering of the second content element by re-rendering the second content element for the second frame is based on the comparison of the second error to the threshold.

3. The method of claim 1, wherein the first error or the second error is quantified in pixels.

4. The method of claim 1, wherein the first error or the second error is based on a change of an observer.

5. The method of claim 1, wherein the second error is based on a distance of an observer from a composition plane upon which the second rendering is composited.

6. The method of claim 1, wherein the second error is based on a distance of a point in the second content element furthest from a composition plane upon which the first rendering or the second rendering is composited.

7. The method of claim 1, wherein the second error is based on a distance that an observer has moved since the first rendering.

8. The method of claim 1 further comprising identifying a change in the second content element and wherein the second error is based on the change.

9. The method of claim 1, wherein generating the second rendering comprises rendering geometry of the second content element to a buffer and then transforming the buffer based on one or more display properties.

10. The method of claim 1, wherein the compositing comprises combining a layer comprising the second rendering of the second content element with a layer comprising a rendering of additional content.

11. The method of claim 1, wherein the re-rendering is performed at a first rate, the compositing is performed at a second rate, and the first rate is independent of the second rate.

12. The method of claim 1, wherein the electronic device includes a first device and a second device, the re-rendering is performed by the first device, and the compositing is performed by the second device.

13. A system comprising:
a device with a processor and a computer-readable storage medium comprising instructions that upon execution by the processor cause the system to perform operations, the operations comprising:
determining a first error corresponding to reusing a first rendering of a first content element from a first frame in a second frame of a computer-generated reality (CGR) environment, wherein the first error is based on a pose change of the device and a first distance between the device and the first content element;
determining a second error corresponding to reusing a first rendering of a second content element from the first frame in the second frame of the CGR environment, wherein the second error is based on the pose change of the device and a second distance between the device and the second content element;
determining, based on the first error, to re-use the first rendering of the first content element from the first frame for the second frame;
determining, based on the second error, to generate a second rendering of the second content element by re-rendering the second content element for the second frame, wherein re-rendering comprises generating a two-dimensional (2D) representation of the second content element based on a three-dimensional (3D) model of the second content element; and
generating the second frame of the CGR environment by compositing the first rendering of the first content element with the second rendering of the second content element.

14. The system of claim 13, the operations further comprising comparing the second error to a threshold and wherein determining to generate a second rendering of the second content element by re-rendering the second content element for the second frame is based on the comparison of the second error to the threshold.

15. The system of claim 13, wherein the first error or the second error is quantified in pixels.

16. The system of claim 13, wherein the second error is based on:
a change of an observer;
a distance of an observer from a composition plane upon which the second rendering is composited;
a distance of a point in the second content element furthest from a composition plane upon which the second rendering is composited; or
a distance that an observer has moved since the first rendering.

17. The system of claim 13 the operations further comprising identifying a change in the second content element and wherein the second error is based on the change.

18. The system of claim 13, wherein generating the second rendering comprises rendering geometry of the second content element to a buffer and then transforming the buffer based on one or more display properties.

19. The system of claim 13, wherein the compositing comprises combining a layer comprising the second rendering of the second content element with a layer comprising a rendering of additional content.

20. A non-transitory computer-readable storage medium storing program instructions that are executable via one or more processors to perform operations comprising:
determining a first error corresponding to reusing a first rendering of a first content element from a first frame in a second frame of a computer-generated reality (CGR) environment, wherein the first error is based on a pose change of an electronic device and a first distance between the electronic device and the first content element;
determining a second error corresponding to reusing a first rendering of a second content element from the first frame in the second frame of the CGR environment, wherein the second error is based on the pose change of the electronic device and a second distance between the electronic device and the second content element;
determining, based on the first error, to re-use the first rendering of the first content element from the first frame for the second frame;
determining, based on the second error, to generate a second rendering of the second content element by re-rendering the second content element for the second frame, wherein re-rendering comprises generating a two-dimensional (2D) representation of the second content element based on a three-dimensional (3D) model of the second content element; and
generating the second frame of the CGR environment by compositing the first rendering of the first content element with the second rendering of the second content element.

* * * * *